Nov. 28, 1939.    D. K. TRESSLER    2,181,839
WINE PROCESS
Filed July 5, 1939
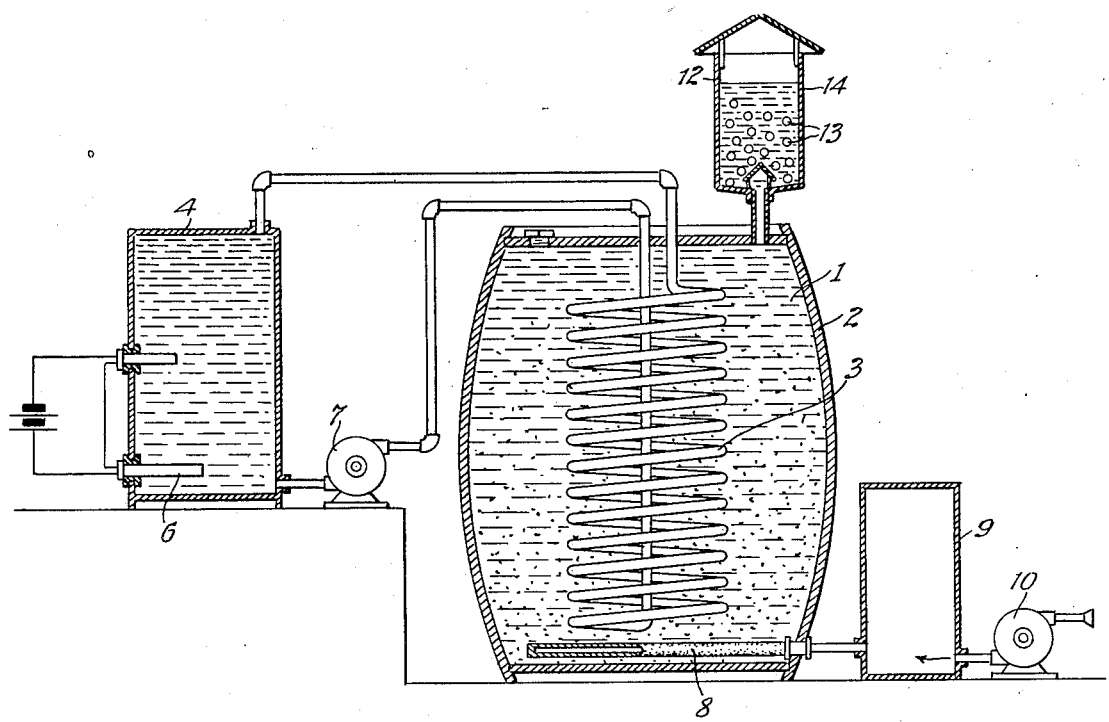
INVENTOR.
Donald K. Tressler
BY Robert V. Morse
ATTORNEY.

Patented Nov. 28, 1939

2,181,839

UNITED STATES PATENT OFFICE 2,181,839

WINE PROCESS

Donald K. Tressler, Geneva, N. Y., assignor to Cornell Research Foundation, Inc., Ithaca, N. Y., a corporation of New York Application July 5, 1939, Serial No. 282,913
In Canada May 12, 1938

3 Claims. (Cl. 99—35)

This invention relates to the manufacture of sherry wine, and has for its general object reduction in the time required for it to acquire the characteristic flavor, so that it may be produced more quickly and at less expense. Another object is to permit the production of sherry wine of good quality from types of grapes heretofore considered unsuitable.

In Spain sherry is made by a time-honored process in which white wine of relatively high alcoholic content is aged in casks above ground. The casks are arranged in three tiers, the oldest wine is kept in the bottom tier, a younger vintage in the middle, and the new wine in the upper tier. Whenever wine is drawn from the lower tier of casks, an equal amount is run in from the tier above, and the middle tier is replenished from the young wine in the top row of casks. The climate of Spain is rather hot and during the long summers the wine becomes warm and slowly develops a sherry flavor.

In California the manufacture of sherry is hastened by a process known as baking. According to this procedure the white wine is placed in large redwood tanks holding 20,000 to 30,000 gallons and is heated by a steam coil or by a similar coil in which hot water is circulated. The temperature range employed is usually 130° to 140° F., and the length of the "baking" or "cooking" period about three months.

I have discovered a method by which a sherry flavor of good quality can be developed in three or four weeks, whereas the California method requires three months. Under my process the saving in time and greater output with a given amount of equipment results in reduced costs of production, even with the present type of grape used for sherry in Europe and California. I have also discovered that with my improved method sherry wine of good quality can be made from much cheaper grapes, including crosses of native American strains, that is, grapes containing Lubrusca blood, such as the Concord for example.

It has heretofore been considered impossible to make sherry from such grapes, due to their foxy flavor and odor. From a commercial viewpoint my new process is especially advantageous since the best wine grapes, which are free from foxiness, cost two or three times as much as Concord and other foxy grapes of Labrusca blood.

High grade grapes of the European Vinifera genus, which are free from foxiness, while they can be grown in California, are not suited to the more rigorous climate of the eastern United States, where the more hardy grapes of the Labrusca blood originated. By my process, when applied to grapes of the Labrusca blood, or crosses containing Labrusca blood, the foxy flavor and odor, and also the color if desired, may be eliminated in a relatively short time, and a good quality sherry may be produced at a fraction of the prior cost. I accomplish this new result by maintaining a very intimate contact of air or oxygen with the wine simultaneously with the baking. This first eliminates the foxiness, then the color. I use extremely fine bubbles obtained by forcing air or other oxygen containing gas through a substantially solid porous material, and simultaneously maintain a baking temperature of about 135°. The sherry flavor develops in about three or four weeks.

Taking up now one specific example of the process for purposes of illustration, reference is made to the drawing, in which the single figure is a general schematic view, showing the elements usually employed.

Referring now to the drawing, the sherry stock 1 to be treated is placed in the container 2, where it is maintained at about 135° F., by means of a steam or hot water coil 3, which is connected to a hot water tank 4. The water in the tank 4 is maintained at the desired temperature by any suitable means such as a thermostatically controlled immersion heater 6, and the heated water is circulated in the coil 3 by a pump 7 or other suitable device. Oxygen is introduced into the heated wine in the container 2 in the form of a very large number of minute bubbles, by forcing air under a few pounds pressure through an alundum or unglazed porcelain tube 8. This diffuser 8 may be of any substantially solid material of a porous nature, such as unglazed porcelain, solid charcoal, porous rubber, porous copper, or other porous metal. Since the pores of such materials are very minute, the air passing into the wine enters it in the form of extremely fine bubbles, and thus a small volume of air possesses a large surface in contact with the wine and the chance for oxidation is greatly increased.

The air is pumped into the diffuser 8 at a few pounds pressure from the air tank 9 by means of the air pump 10. The air leaving the top of the cask or container 2 carries in the form of vapour some alcohol and esters, and a trap 12 is provided to recover them and return them to the wine. This trap 12 contains some glass balls 13 and some wine 14. The vapours are condensed in the relatively cool wine 14, which with the slight variations in pressure that occur from time to time, works its way back into the container 2.

By the process described, involving the simultaneous action of minute bubbles and baking a distinct sherry flavor develops in four weeks or less, or about one-third of the time formerly required. The wine is racked, fortified either before or after baking, and if desired sweetened in the usual manner. The freshly prepared sherry after cooling is generally allowed to stand for one or two weeks and then filtered to remove any precipitates and clarify it. This step can be accelerated if desired by partially freezing the sherry, or cooling to about 40° F., letting it stand a few days and then adding a fining agent (such as blood albumin or gelatine) before filtering.

The usual sherry stock is a straw-colored wine having about 20% alcohol, from 2% to 10% sugar, and relatively low in acidity—say from .4 to .7 acidity calculated in grams of tartaric acid per 100 cc. of wine.

Concord wine has been considered unsuitable for sherry, but I have found that it is now possible by the treatment described to produce a commercially satisfactory sherry from Concord or other Labrusca grapes. For example, in one test I took a cold pressed Concord wine, treated it with $\frac{1}{10}$ of 1% of a decolorizing carbon (trade name Nuchar), and then filtered. This treatment was followed by a secondary treatment with a very small amount of bentonite ($\frac{1}{10}$ of 1%) and a second filtration. In treating the cold pressed Concord wine in this way, all of the foxy flavor and nearly all of the color were removed, thus yielding a bland characterless wine which would be unsuited for beverage purposes. When this decolorized Concord wine was maintained at 135° F., and air passed simultaneously in through the diffuser, of the type to produce minute bubbles as described above, a pronounced sherry flavor was developed. At the end of this period, the wine was sweetened with 2½% of its weight of sugar (sucrose) and fortified to an alcoholic content of 18.5% ethyl alcohol by volume. In this particular experiment, two gallons of freshly distilled grape brandy and one and a half gallons of 95% grain alcohol were employed in the fortification of 18 gallons of the wine. The baking and aeration by the special device described above were continued for three weeks. At the end of this period the flavor of the wine was equivalent to that of a first-class pale dry California sherry baked by the usual procedure for four months.

Wine made from ordinary hot pressed or cold pressed Concord or other Labrusca grapes can also be converted by my process into sherry without treatment with decolorizing carbon, by aeration at about 135° F. for about six weeks with air or four weeks with oxygen, using the diffusion method and apparatus above described. This treatment completely eliminates the usual foxy flavor and odor of hot pressed Concord wine, and also eliminates the purple color.

The warmer the wine the more rapidly the foxiness and color are eliminated. If air is used in place of oxygen, approximately a half longer time is required for a given effect. In as much as in any case oxygen is the active agent and is present in the air in uncombined form, it will be understood that the term "oxygen" in the claims means free oxygen in whatever form.

The more expensive types of grapes used for sherry in the past have been sufficiently sweet so that acidity was no special problem, but the much higher acidity of the cheaper grapes such as the Labrusca types must be reduced to obtain good results with the present process. While in the illustration above given the wine was sweetened at the end of the treatment period, I have found that when the acidity is reduced before the treatment with oxygen, instead of after, the baking process is facilitated by accelerating the formation of esters and aldehydes.

As an example of sherry making under this process on a larger scale, hot pressed Concord grapes were fermented into wine, racked (siphoned) from lees, and fortified with grape brandy to approximately 18.5% alcohol. The acidity was then substantially reduced as described, being adjusted to approximately 0.45% acidity calculated as tartaric acid, by neutralization by potassium carbonate, for example. By so doing at this stage of the process the subsequent baking process was facilitated, and the formation of esters and aldehydes accelerated. The wine was then heated to 140° F. The quantities being large, several thousand gallons, this was most conveniently accomplished by circulating the wine thru a heater and back into the tank, instead of putting the heater directly in the tank. When such a large amount about 6000 gallons was in an insulated tank, and once heated to 140° F. it held its heat for a long time with only a few degrees drop in temperature. It was found that it would maintain the temperature in the desired region of about 130° to 140° F. if heat was supplied about 30 minutes every 24 hours.

Oxygen was supplied to the heated wine in the form of fine bubbles issuing from the pores of porous porcelain diffusion tubes as described above. After approximately thirty days of this combined baking and aeration, the wine took on the characteristics of sherry. It was then allowed to cool, after which it was pumped into another tank, where it was fined by the addition of first one pound of grape tannin and then one pound of haemofene,—for regular sherry. This is normally a rather dark sherry, when made with Concord grapes. Other Labrusca grapes, such as the Niagara, Catawba, and Clinton may be used successfully. For "Pale Dry Sherry" one part Niagara wine was blended with one part Concord, made as indicated above. The Niagara wine was made the same way as Concord, except that the grapes were not heated prior to pressing. Gelatine was used instead of haemofene for pale dry sherry. After production as above the wine is again filtered, usually aged for six to twelve months, and filtered again when bottled.

While my preferred temperature is 135° F., or between 130° and 140° F., it will be understood that the process is not precisely limited to exact or critical temperatures, though approximately the temperatures such as stated above give the best efficiency; the phrase "about 135° F." in the claims will be understood as including the usual range of temperatures in the neighborhood of 135° F., in which sherry flavor develops.

Other types of wines besides sherry can be made by a similar process using different ranges of temperature and time, and are described in my copending application Serial No. 225,896 filed August 20, 1938.

While the process is particularly useful with grapes of Labrusca blood, due to their cheapness, high quality grapes can also be used if desired. It will be understood that the foregoing specific examples are merely for purposes of illustration, to make clear the principles of the process, and that the invention is susceptible to various modifications and adaptations in different installations as will be apparent to those skilled in the art without departing from the scope of the following claims.

This application is a continuation in part of my copending application Serial No. 106,502, Wine process, filed October 20, 1936.

I claim:

1. A process for making sherry wine, which consists in taking wine stock including wine made from grapes of Labrusca blood, heating it to approximately 135° F., and maintaining it at that temperature for a period of several weeks, and simultaneously passing large quantities of minute bubbles containing oxygen through the heated stock, whereby a sherry flavor is produced in a few weeks.

2. A process for making sherry wine from Concord grapes, which consists in taking Concord grape wine, heating it to approximately 135° F., and maintaining it at that temperature for a period of several weeks, and simultaneously passing large quantities of minute bubbles containing oxygen through the heated wine, whereby a sherry flavor is produced in a few weeks.

3. A process for making sherry wine, which consists in taking juice from grapes containing Labrusca blood fermenting to form grape wine, reducing the acidity of the wine, heating it to approximately 135° F., fortifying it, maintaining it at approximately 135° F. for a period of several weeks, and simultaneously passing large quantities of minute bubbles containing oxygen through the heated wine, whereby a sherry flavor is produced in a few weeks.

DONALD K. TRESSLER.